United States Patent
Swanson

(10) Patent No.: US 8,376,131 B1
(45) Date of Patent: Feb. 19, 2013

(54) ASSEMBLY MACHINE CONSTRUCTED WITH A LIGHT-WEIGHT MODULE

(76) Inventor: Douglas L. Swanson, McKean, PA (US)

(*) Notice: Subject to any disclaimer, the term of this patent is extended or adjusted under 35 U.S.C. 154(b) by 2005 days.

(21) Appl. No.: 11/238,003

(22) Filed: Sep. 28, 2005

(51) Int. Cl.
*B65G 21/08* (2006.01)

(52) U.S. Cl. ............ 198/860.2; 198/860.1; 198/861.1

(58) Field of Classification Search ............ 198/860.1, 198/860.2, 861.1
See application file for complete search history.

(56) References Cited

U.S. PATENT DOCUMENTS

| | | | | |
|---|---|---|---|---|
| 3,491,873 A * | 1/1970 | Fauth | | 198/836.1 |
| 3,605,994 A * | 9/1971 | Parlette | | 198/861.1 |
| 3,825,108 A * | 7/1974 | Stone | | 198/861.1 |
| 5,186,314 A * | 2/1993 | Clopton | | 198/860.2 |
| 5,328,020 A * | 7/1994 | Clopton | | 198/779 |
| 5,361,894 A * | 11/1994 | Solcz | | 198/860.1 |
| 5,657,854 A * | 8/1997 | Chen et al. | | 198/787 |
| 5,904,242 A * | 5/1999 | Swanson | | 198/860.2 |
| 6,036,003 A * | 3/2000 | Swanson | | 198/860.2 |
| 6,273,635 B1 * | 8/2001 | Swanson | | 403/299 |
| 6,279,891 B1 * | 8/2001 | Jaeger | | 270/58.01 |
| 6,299,392 B1 * | 10/2001 | Swanson | | 408/234 |
| 6,591,979 B1 * | 7/2003 | Karpy | | 198/860.1 |
| 6,848,572 B1 * | 2/2005 | Sisson et al. | | 198/860.1 |
| 7,137,506 B2 * | 11/2006 | Munoz-Guerra et al. | | 198/860.2 |

* cited by examiner

*Primary Examiner* — Douglas Hess
(74) *Attorney, Agent, or Firm* — Richard K Thomson

(57) ABSTRACT

A plurality of modules of sufficiently light weight (<80 lbs) are assembled end-to-end to construct an assembly machine for performing desired operations on a series of workpieces. A supporting spine underlies the interconnected modules and supports them and associated equipment in the desired array. The modular construction permits the assembly machine to be reconfigured as needed should operational alterations require it, including, but not limited to, the cannibalization of the machine with the modules being usable in constructing a machine having entirely different characteristics.

10 Claims, 3 Drawing Sheets

ASSEMBLY MACHINE CONSTRUCTED WITH A LIGHT-WEIGHT MODULE

BACKGROUND AND SUMMARY OF THE INVENTION

The present invention is directed to the field of multiple station assembly machines. More particularly, the present invention is directed to an assembly machine constructed with a light-weight, module and with modular interconnecting supports which permits construction of a variety of assembly machine sizes, attitudes, and configurations, as well as recycling of modules.

Automated assembly machines are typically categorized by their basic configuration as either linear or rotary. Generally, the linear machines offer more flexibility and often can produce a more economic use of space. The typical linear machine will utilize a carrier belt or chain to cycle work pieces mounted on fixtures sequentially between successive workstations where various process/assembly/test operations are performed thereon. Quite often, an assembly machine will be designed and built to operate on a particular product or group of products and 1) once those workpieces are removed from the stream of commerce, 2) the machine has a portion in need of repair/replacement, or 3) a workstation needs to be added, the assembly machine becomes scrap.

This problem has been successfully addressed in commonly assigned U.S. Pat. Nos. 5,904,242; 6,273,635; and 6,299,392 which are hereby incorporated by reference. In those patents, an assembly machine having versatile module construction enables the building blocks of the assembly machine to be reconfigured into a totally different layout, if need be, to accommodate future workpieces and workstation requirements. These modular machines, sold under the trademark AGILE ASSEMBLY, have met with worldwide acceptance in the market place. The precision machining of the modules allows them to be easily assembled and the T-keys permit screwless assembly and attachment using common key nut and bolt sizes.

The present invention comprises a reconfigurable assembly machine, said machine comprising: a light-weight module configured as a rectangular frame member having four generally open sides, two opposing sides having pairs of spaced apart inverted T-shaped channels for permitting attachment using precision key and T-nut fasteners, the intermediate adjacent sides having at least one through opening; two end walls each with an open center portion to permit electrical/hydraulic lines to pass there through; a supporting spine having a narrow support section underlying the light-weight module and having a maximum width which is less than a maximum width of the module; whereby the light-weight module weighs no more than 80 lbs and, in some cases only 50 pounds, and is readily manipulated by one person. The preferred length of the module is 18", or 450 mm.

The assembly machine further comprises a support frame including a narrow spine member, the spine underlying the light-weight module and having a maximum width less than a maximum width of the module. The components of the supporting spine are equipped with integral T-slots and T-bar fasteners, as described above, enabling their fastenerless assembly, as well as attachment thereto and detachment therefrom.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
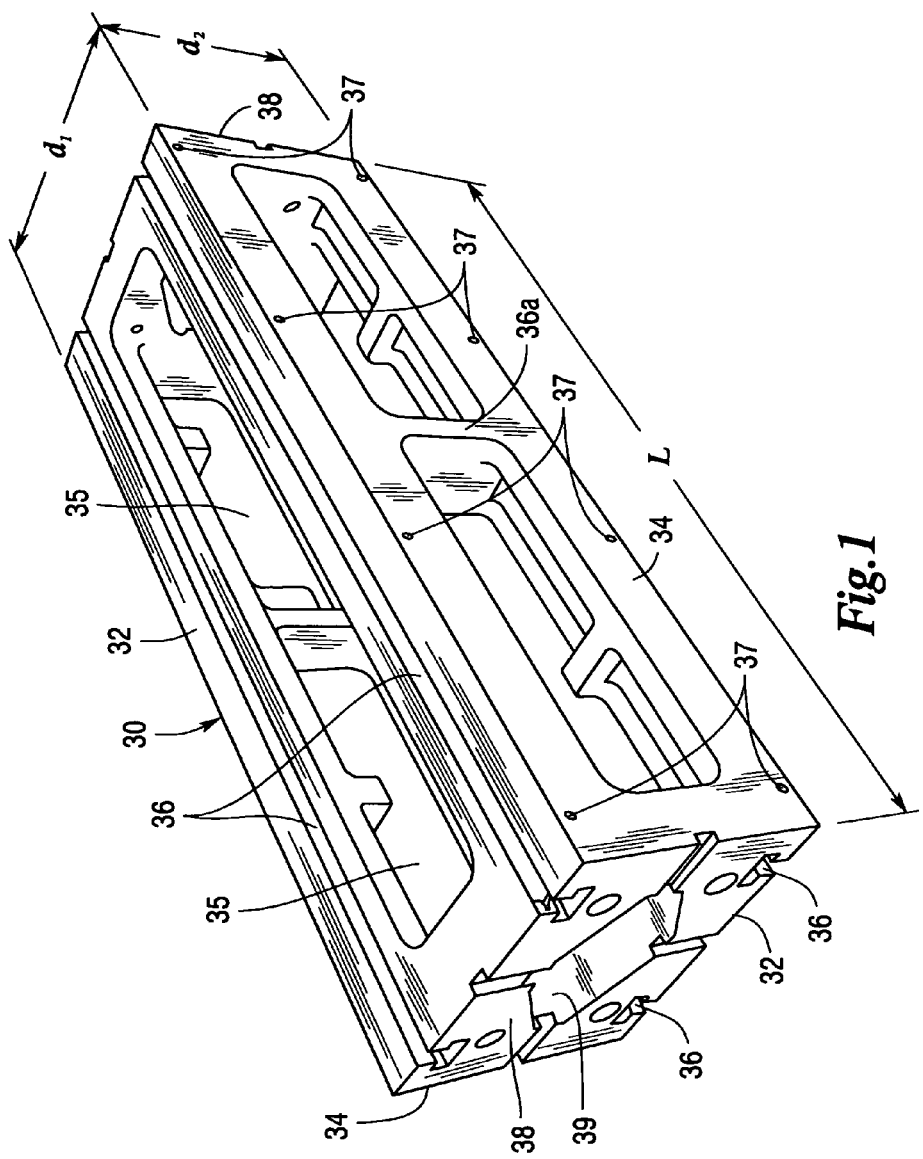
FIG. 1 is a perspective front view of a first embodiment of the interchangeable module used to construct the assembly machine of the present invention.
Figure 2:
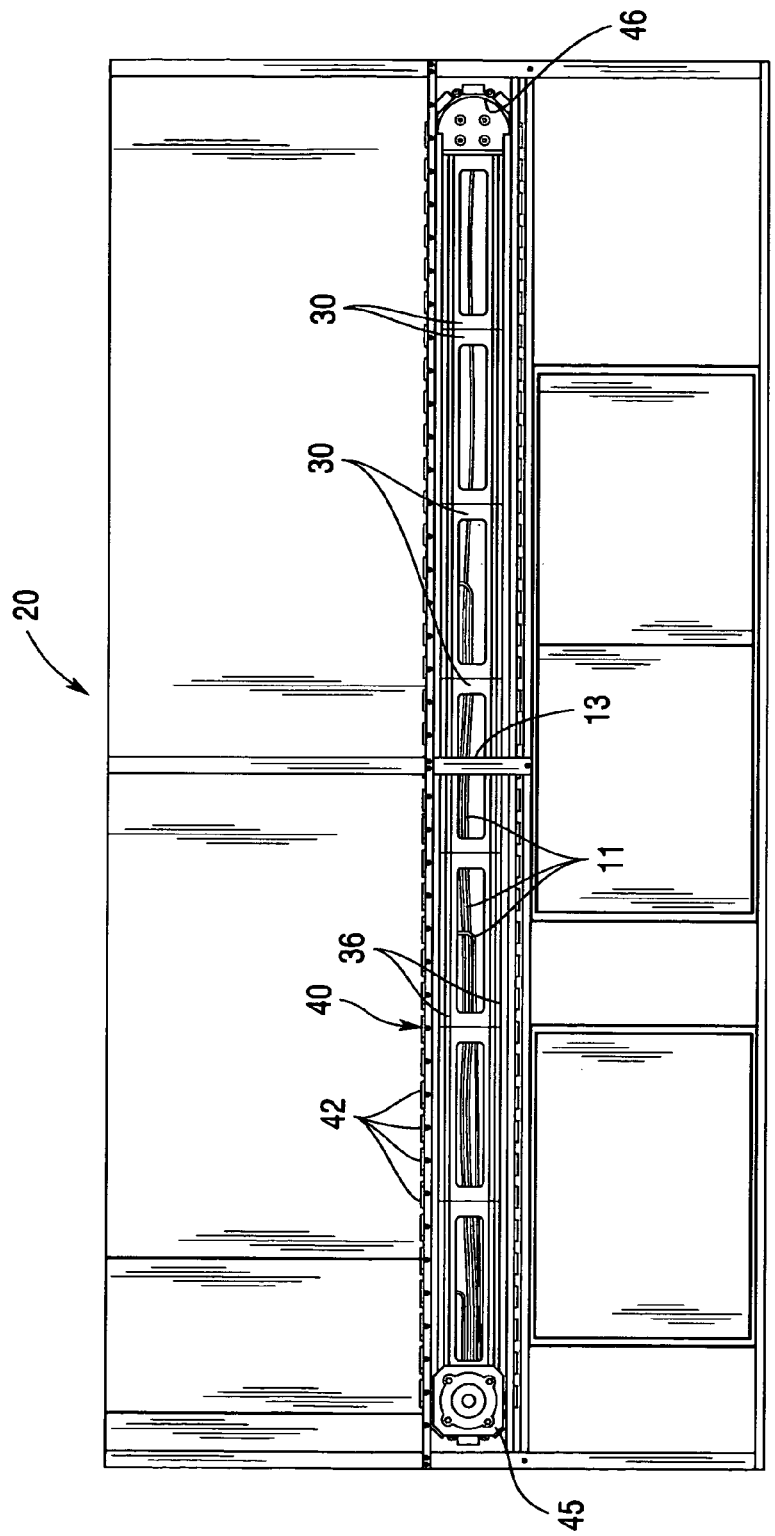
FIG. 2 is a side view of a first embodiment of the assembly machine of the present invention in which the modules provide an over/under layout; and, FIG. 3 is a perspective view of a second embodiment of the assembly machine of the present invention in which the modules provide a carousel configuration.

A first embodiment of the assembly machine of the present invention is depicted in FIG. 2 generally at 20. Assembly machine 20 is constructed of a plurality of light-weight modules 30 assembled end-to-end to define the operational length of assembly machine 20. Module 30 is generally rectangular in cross section, having two sides 32 with a dimension $d_1$ and two sides 34 with a dimension $d_2$, where, preferably, $d_1 > d_2$ perhaps as much as 50% greater, although $d_1 = d_2$ is a possible alternative. The two sides 32 are generally entirely open, each with T-slots 36 formed therein to permit attachment of elements using T-nuts as has been disclosed in U.S. Pat. No. 6,036,003. The tolerances regarding the casting and machining of module 30 is rigidly maintained, as with the larger modules described in the '003 patent. The distinction from the teachings of that patent include the smaller, light weight module and the inclusion of T-slots 36 on both opposing sides 32. In addition, both opposing sides 34 have two openings 35 created by reinforcing column 36a. Tapped holes 37 are provided in sides 34 for purposes which will be discussed hereinafter. T-slots 36 provide means for attaching support structure 13, and the like. The versatile, open construction of module 30 permits its alternative use to construct an over/under conveyor layout of the type shown in FIG. 2 or the carousel layout depicted in FIG. 3, a feature not available with the AGILE ASSEMBLY of the previous patents.

The two ends 38 have openings 39. Openings in sides 32, 34 and ends 38 permit ready access to run electrical and hydraulic lines 11, as needed for various applications. In this first embodiment, conveyor 40 is driven by motor 45 around driven pulley or stationary guide 46, each of which has a horizontal rotational axis. Conveyor 40 is made of individual plates 42 which are hingedly interconnected.

Figure 3:
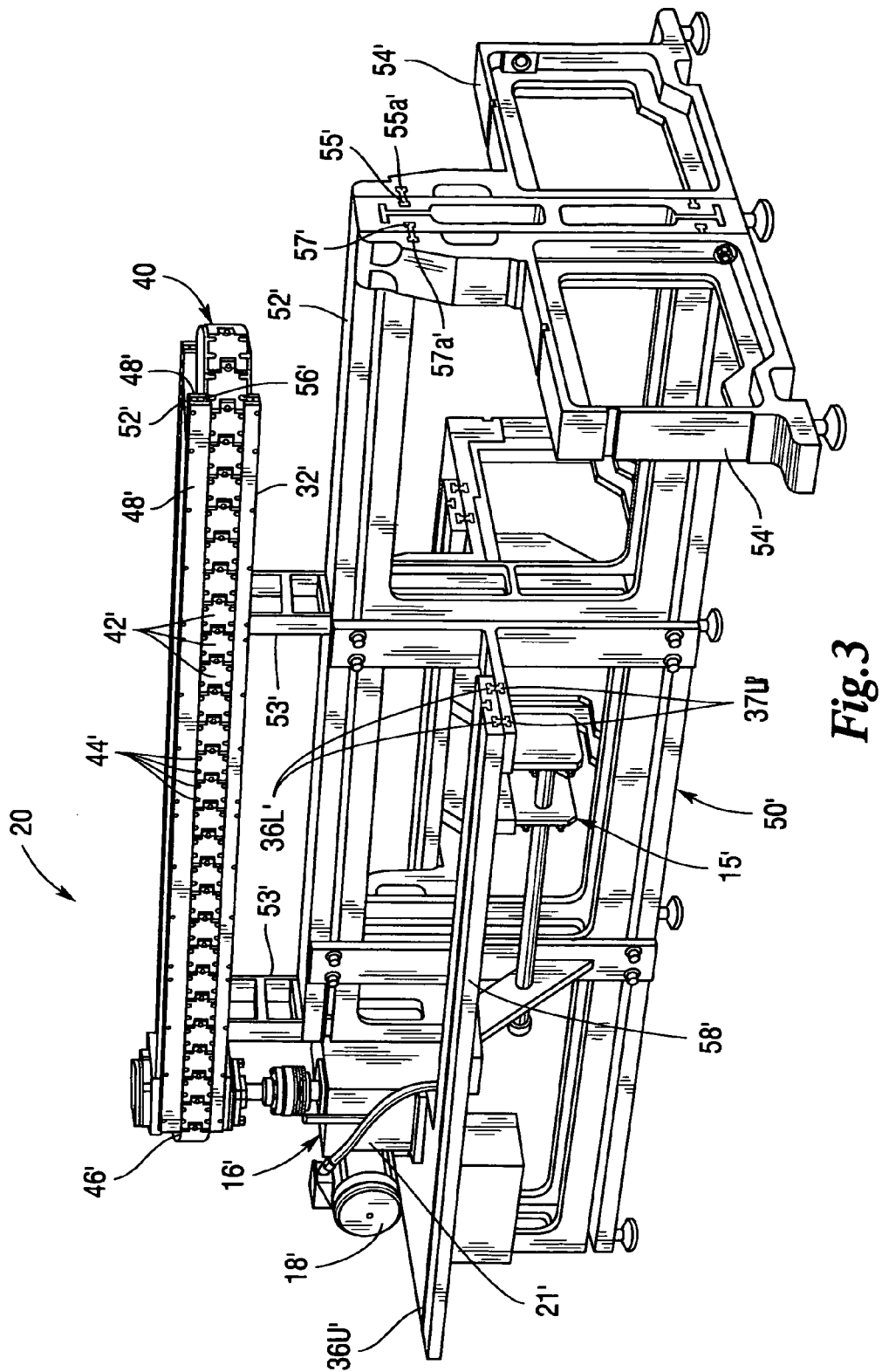

The smaller module 30 requires a support 50' best seen in FIG. 3. Support 50' includes a spine 52' extending horizontally and having a maximum lateral dimension which is less than dimension $d_1$. Spine 52' is shown having laterally extending stabilizing legs 54' attached to spine 52' by engaging a conventional T-nut (not shown) in T-slots 55' and 55a' and in T-slots 57' and 57a'. Stabilizing legs 54' are identified as AGILEDOCK. Spine 52' is connected to one of the sides 32' by support blocks 53' using the T-slots 36. In this second embodiment, conveyor 40' has a drive module 16' including an electric motor 18', an indexing gear drive assembly 21', and a driven pulley 46' which rotates about a vertical axis. Inner and outer plates 48' sandwich shorter plate 52' to provide a slot 56' into which the edge of conveyor plates 42' are received and by which structure the plates 42' are guided. Plates 48' and 52' are attached to sides 34 by fasteners which are received in tapped holes 37. Plates 42' have a plurality of tapped holes 44' which provide means by which workpiece supports (not shown) may be attached to the conveyor 40' so that they may move supported workpieces from station to station for various machining/assembly operations. AGILE APRON 58' is secured about the periphery of assembly machine 20 by inserting T-nuts into T-slots 36L' and 37u' and, by virtue of the upper T-slot 36u' and the two lower slots 36L', provide the ability to attach/suspend components 15' thereon and there beneath, respectively.

The assembly machine of the present invention is constructed of a plurality of modules 30 of sufficiently light weight (<80 lbs, certain modules weighing only 50 lbs) which are assembled end-to-end to construct a machine for performing particular desired operations on a series of workpieces. The modular construction permits the assembly machine to be reconfigured as needed should operational alterations require it, including, but not limited to, the cannibalization of the machine with the modules being usable in constructing a machine having entirely different characteristics.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A reconfigurable assembly machine, said machine comprising:
   a) a light-weight module configured as a rectangular frame member having four generally open sides, each of said four generally open sides defining a surface area and having an opening extending entirely there through which occupies a significant portion of its said surface area, two opposing sides having pairs of spaced apart inverted T-shaped channels for permitting attachment using T-nut fasteners;
   b) two end walls each with an opening extending entirely through a center portion to permit electrical/hydraulic lines to pass there through;
   c) a supporting spine having a narrow support section underlying said light-weight module and having a maximum width which is less than a maximum width of said module;
whereby said light-weight module weighs no more than 80 lbs and said assembly machine is readily assembled by one person.

2. The assembly machine of claim 1 wherein said module has a length of 18".

3. The assembly machine of claim 2 wherein said assembly machine comprises a plurality of said light-weight modules interconnected end-to-end to provide an overall length as required by the particulars of a specific application.

4. A reconfigurable assembly machine, said machine comprising:
   a) a light-weight module configured as a rectangular frame member having four generally open sides, each of said four generally open sides defining a surface area and having an opening extending entirely there through which occupies a significant portion of its said surface area, two opposing sides having pairs of spaced apart inverted T-shaped channels for permitting attachment using T-nut fasteners, said intermediate adjacent sides having at least one through opening;
   b) two end walls each with an open center portion to permit electrical/hydraulic lines to pass therethrough;
   c) a support frame including a narrow spine member, said spine underlying said light-weight module and having a maximum width less than a maximum width of said module
whereby said light-weight module weighs no more than 80 lbs and said assembly machine is readily assembled by one person.

5. The assembly machine of claim 4 wherein said module has a length of 18".

6. The assembly machine of claim 5 wherein said assembly machine comprises a plurality of said light-weight modules interconnected end-to-end to provide an overall length as required by the particulars of a specific application.

7. An assembly machine comprising
   a) a light-weight module configured as a rectangular frame member having four generally open sides, each of said four generally open sides defining a surface area and having an opening extending entirely there through which occupies a significant portion of its said surface area;
   b) a supporting spine having a narrow support section underlying said light-weight module and having a maximum width which is less than a maximum width of said module.

8. The assembly machine of claim 7 further comprising a plurality of stabilizing leg elements which interconnect to said supporting spine by means of T-nuts in T-slot connections.

9. The assembly machine of claim 7 further comprising an apron element designed to extend over a substantial length of said assembly machine, said apron having a T-slot in a top surface and at least one T-slot in a lower surface to facilitate attachment of articles thereto.

10. The assembly machine of claim 9 wherein said at least one T-slot in said lower surface of said apron comprises at least two T-slots.

* * * * *